US010690998B2

(12) United States Patent
Hong et al.

(10) Patent No.: US 10,690,998 B2
(45) Date of Patent: Jun. 23, 2020

(54) CAMERA MODULE

(71) Applicant: SAMSUNG ELECTRO-MECHANICS CO., LTD., Suwon-si (KR)

(72) Inventors: Seung Hee Hong, Suwon-si (KR); Sang Jong Lee, Suwon-si (KR); Min Ki Jung, Suwon-si (KR); Hee Soo Yoon, Suwon-si (KR); Su Bong Jang, Suwon-si (KR); Seung Jae Song, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/273,805

(22) Filed: Feb. 12, 2019

(65) Prior Publication Data

US 2020/0012170 A1 Jan. 9, 2020

(30) Foreign Application Priority Data

Jul. 4, 2018 (KR) .................. 10-2018-0077432

(51) Int. Cl.
*G03B 9/06* (2006.01)
*G03B 7/00* (2014.01)
*G02B 13/00* (2006.01)

(52) U.S. Cl.
CPC .............. *G03B 9/06* (2013.01); *G03B 7/003* (2013.01); *G02B 13/0055* (2013.01)

(58) Field of Classification Search
CPC .................................. G03B 9/04; G03B 9/06

USPC ........................................................ 396/459
See application file for complete search history.

(56) References Cited

U.S. PATENT DOCUMENTS

| 6,027,261 | A  | * | 2/2000  | Naganuma | G03B 9/04 |
|           |    |   |         |          | 396/508   |
| 8,746,570 | B2 | * | 6/2014  | Powell   | G01J 5/06 |
|           |    |   |         |          | 235/462.11|
| 9,477,137 | B2 | * | 10/2016 | Yamamoto | G03B 9/00 |
| 2018/0039158 | A1 |  | 2/2018 | Shikama et al. | |
| 2018/0164537 | A1 | * | 6/2018 | Lee | H04N 5/2254 |

FOREIGN PATENT DOCUMENTS

| JP | 10039369 A | * | 2/1998 |
| JP | 2001215552 A | * | 8/2001 |
| JP | 2006038886 A | * | 2/2006 |
| JP | 2009195084 A | * | 8/2009 |
| KR | 10-1635783 B1 | | 7/2016 |
| KR | 10-1664194 B1 | | 10/2016 |
| KR | 10-2017-0123615 A | | 11/2017 |

* cited by examiner

*Primary Examiner* — Clayton E. LaBalle
*Assistant Examiner* — Leon W Rhodes, Jr.
(74) *Attorney, Agent, or Firm* — NSIP Law

(57) ABSTRACT

A camera module includes a housing including a lens module; a diaphragm module to form N apertures of different sizes, where N is a natural number, with blades disposed on an object side of the lens module; and a diaphragm driving unit disposed with the diaphragm module, and including a driving coil and a magnetic member disposed opposite to the driving coil, the magnetic member being movable in a direction perpendicular to an optical axis to be fixed in N positions along a movement path.

18 Claims, 13 Drawing Sheets

| Case | COIL POLARITY OF OPPOSING SURFACES OF DRIVING MAGNETS | | |
|---|---|---|---|
| | Coil 1-1(521b-1) | Coil 1-2(521b-2) | Coil 1-3(521b-3) |
| Case 1-1 | N POLE | S POLE | S POLE |
| Case 1-2 | S POLE | N POLE | S POLE |
| Case 1-3 | S POLE | S POLE | N POLE |

| Case | COIL POLARITY OF OPPOSING SURFACES OF DRIVING MAGNETS | |
|---|---|---|
| | Coil 2-1(521b-4) | Coil 2(521b-5) |
| Case 2-1 | N POLE | N POLE |
| Case 2-2 | N POLE | S POLE |
| | S POLE | N POLE |
| Case 2-3 | S POLE | S POLE |

| Case | COIL ELECTRIC CURRENT SWITCH | | |
|---|---|---|---|
| | Coil 3-1(521b-6) | Coil 3-2(521b-7) | Coil 3-3(521b-8) |
| Case 3-1 | ON | OFF | OFF |
| Case 3-2 | OFF | ON | OFF |
| Case 3-3 | OFF | OFF | ON |

CAMERA MODULE

CROSS-REFERENCE TO RELATED APPLICATION

This application claims the benefit under 35 USC 119(a) of Korean Patent Application No. 10-2018-0077432 filed on Jul. 4, 2018 in the Korean Intellectual Property Office, the entire disclosure of which is incorporated herein by reference for all purposes.

BACKGROUND

1. Field

The following description relates to a camera module.

2. Description of Background

A camera module has been adopted for use in portable electronic devices such as smartphones, tablet PCs, notebook computers, and the like. In the case of a conventional digital camera, a mechanical diaphragm has been provided to change the incident amount of light depending on the photographing environment. However, in the case of a camera module used in a small product, such as a portable electronic device, it has been difficult to separately provide a diaphragm, because of structural characteristics and space limitations.

For example, an autofocusing function may be deteriorated, due to an increase in weight of the camera module by various components for driving the diaphragm. Further, when a power connection portion such as a coil for driving the diaphragm is provided in the diaphragm itself, a problem in which the power connection portion is caught by the vertical movement of the lens during the autofocusing operation may occur.

Further, since a diaphragm module having various apertures should be installed in a relatively narrow space, the position of the driving unit may not be accurately fixed, and an accurate aperture may not be realized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module including: a housing having a lens module; a diaphragm module to form N apertures of different sizes, where N is a natural number, with blades disposed on an object side of the lens module; and a diaphragm driving unit disposed with the diaphragm module, and including a driving coil and a magnetic member disposed opposite to the driving coil, the magnetic member being movable in a direction perpendicular to an optical axis to be fixed in N positions along a movement path.

The magnetic member may include a driving magnet magnetized with a permanent magnet.

The driving coil may include N driving coils.

A surface of the driving magnet opposite to the N driving coils may be magnetized to the N pole or S pole.

Surfaces of the N driving coils opposite to the driving magnet may be magnetized to the N pole or S pole, respectively.

N may be equal to three.

The driving magnet may include two driving magnets, and the driving coil may include at least two driving coils.

The two driving magnets may be magnetized such that one surface of each of the two driving magnets opposing the driving coils is magnetized to the N pole and another surface of each of the at least two driving magnets is magnetized to the S pole.

The magnetic member may include a non-magnetized driving yoke.

Surfaces of the driving coils opposite to the driving yoke may be magnetized to the N pole or S pole, respectively.

The diaphragm driving unit may include stoppers disposed at end portions of the movement path to restrict movement of the magnetic member.

The driving coil may be disposed in the housing.

In another general aspect, a camera module includes: a lens module; blades configured to form apertures to selectively change an amount of light incident on the lens module; and a magnetic portion configured to move linearly along a movement path in order to rotate the blades to form the apertures.

The magnetic portion may include magnetic member opposed to a driving coil, and the magnetic member may be fixed at N positions along the movement path in order to form N apertures, where N in a natural number.

The blades may include a first blade and a second blade, and a portion of the first blade and a portion of the second blade may overlap each other in an optical axis direction.

The camera module may include a gap spacer disposed between the blades and the lens module, and the gap spacer may include a through-hole smaller in size than a size of a largest aperture formed by the blades.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
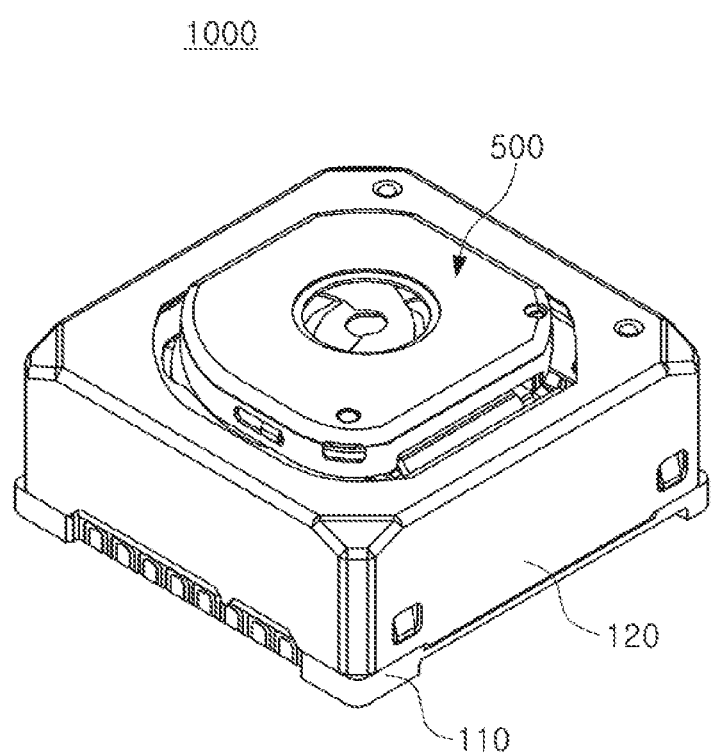
FIG. 1 is a perspective view of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described in detail with reference to the drawings.

A camera module may be mounted on a portable electronic device such as a mobile communications terminal, a smartphone, a tablet PC, and the like.

Figure 2:
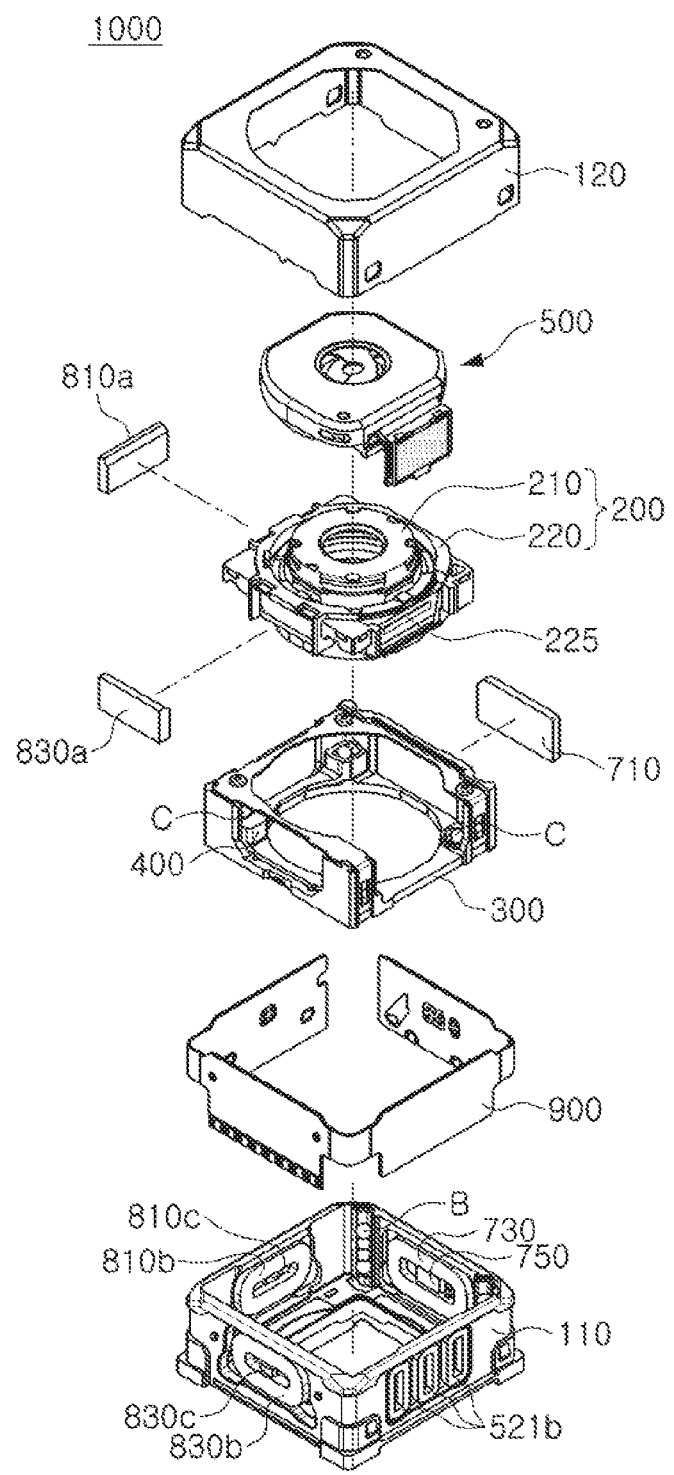
FIG. 2 is an exploded perspective view of a camera module according to an example.
Figure 3:
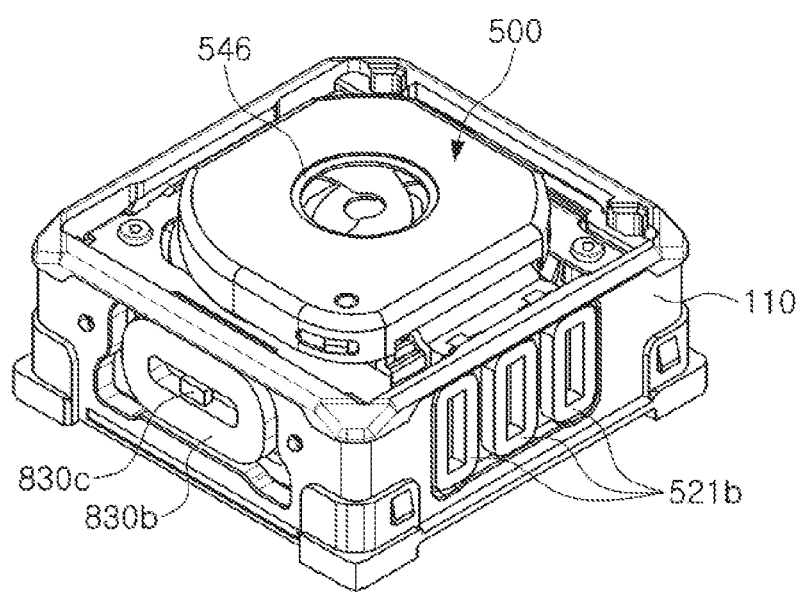
FIG. 3 is a partially cutaway perspective view of a camera module according to an example.

FIG. 1 is a perspective view of a camera module according to an example, FIG. 2 is an exploded perspective view of a camera module according to an example, and FIG. 3 is a partially cutaway perspective view of a camera module according to an example.

Referring to FIGS. 1 to 3, a camera module 1000 may include a lens module 200, a carrier 300, a guide unit 400, a diaphragm module 500, a housing 110, and a case 120.

The lens module 200 may include a lens barrel 210 having a plurality of lenses for photographing an object, and a holder 220 for accommodating the lens barrel 210. A plurality of lenses may be disposed inside the lens barrel 210 along an optical axis. The lens module 200 may be accommodated in the carrier 300.

The lens module 200 may be configured to be movable for focus adjustment in an optical axis direction. For example, the lens module 200 may be moved together with the carrier 300 by a focus adjusting unit in an optical axis direction.

The focus adjusting unit may include a magnet 710 and a coil 730, such as an AF driving coil, for generating a driving force in the optical axis direction. A position sensor 750, for example, a hall sensor may be provided to sense a position of the lens module 200, for example, a position of the carrier 300 in the optical axis direction.

The magnet 710 may be mounted on the carrier 300. For example, the magnet 710 may be mounted on one side of the carrier 300.

The coil 730 and the position sensor 750 may be mounted on the housing 110. For example, the coil 730 and the position sensor 750 may be fixed to the housing 110 to face the magnet 710. The coil 730 and the position sensor 750 may be provided on a substrate 900, and the substrate 900 may be mounted on the housing 110.

The magnet 710 may be a movable member that is mounted on the carrier 300 and that moves together with the carrier 300 in the optical axis direction, and the coil 730 and the position sensor 750 may be fixating members fixed to the housing 110.

When power is applied to the coil 730, the carrier 300 may be moved by the electromagnetic influence between the magnet 710 and the coil 730 in the optical axis direction. The position sensor 750 may sense a position of the carrier 300 in the optical axis direction.

Since the lens module 200 may be accommodated in the carrier 300, the lens module 200 may also be moved together with the carrier 300 by the movement of the carrier 300 in the optical axis direction.

A rolling member B may be disposed between the carrier 300 and the housing 110, to reduce friction between the carrier 300 and the housing 110, when the carrier 300 is moved. The rolling member B may be provided in the form of a ball.

The rolling member B may be disposed on both sides of the magnet 710 (or the coil 730).

A yoke may be mounted on the substrate 900. For example, a yoke may be disposed to face the magnet 710, with the coil 730 being disposed between the yoke and the magnet 710.

An attraction force may be exerted between the yoke and the magnet 710 in a direction perpendicular to the optical axis direction.

Therefore, the rolling member B may be kept in contact with the carrier 300 and the housing 110 by the attraction force between the yoke and the magnet 710.

The yoke may also function to focus a magnetic force of the magnet 710. Therefore, leakage of magnetic flux may be prevented.

The yoke and magnet 710 may form a magnetic circuit.

The lens module 200 may be moved in a first direction perpendicular to the optical axis, and in a second direction perpendicular to the optical axis and perpendicular to the first direction, to correct image shake due to user's handshake or the like.

For example, a shake correction unit may compensate for a shake phenomenon by imparting a relative displacement corresponding to the shake phenomenon to the lens module 200, when a shake phenomenon occurs due to a user's hand-shake or the like during an image capturing operation.

The guide unit 400 may be accommodated on an upper portion of the carrier 300 in the optical axis direction. The holder 220 may be mounted on the guide unit 400. A ball member C serving as a rolling bearing operation may be provided between the carrier 300 and the guide unit 400 in the optical axis direction, and between the guide unit 400 and the holder 220 in the optical axis direction.

The guide unit 400 may be configured to guide the lens module 200, when the lens module 200 is moved in the first direction and in the second direction, perpendicular to the optical axis.

The lens module 200 may be configured to be moved relative to the guide unit 400 in the first direction, and the guide unit 400 and the lens module 200 may be configured to be moved together within the carrier 300 in the second direction.

The shake correction unit may include magnets 810a and 830a and coils 810b and 830b, for example first and second OIS driving coils, which generate a driving force for shake correction. Position sensors 810c and 830c, for example, hall sensors, may be provided to sense a position of the lens module 200 in the first direction and in the second direction.

Among the magnets 810a and 830a and the coils 810b and 830b, a portion of the magnet 810a and a portion of the coil 810b may be arranged to face each other in the first direction to generate a driving force in the first direction, and the remaining magnet 830a and the remaining coil 830b may be arranged to face each other in the second direction to generate a driving force in the second direction.

The magnets 810a and 830a may be mounted on the lens module 200, and the coils 810b and 830b and the position sensors 810c and 830c, facing the magnets 810a and 830a, may be fixed to the housing 110. The coils 810b and 830b and the position sensors 810c and 830c may be provided on the substrate 900, and the substrate 900 may be mounted on the housing 110.

The magnets 810a and 830a may be movable members moving together with the lens module 200 in the first direction and in the second direction. The coils 810b and 830b and the position sensors 810c and 830c may be fixating members fixed to the housing 110.

The ball member C for supporting the guide unit 400 and the lens module 200 may be provided. The ball member C may function to guide the guide unit 400 and the lens module 200 in a shake correction process.

The ball member C may be provided between the carrier 300 and the guide unit 400, between the carrier 300 and the lens module 200, and between the guide unit 400 and the lens module 200.

When a driving force in the first direction is generated, the ball member C disposed between the carrier 300 and the guide unit 400 and between the carrier 300 and the lens module 200 may be rolled in the first direction. Therefore, the ball member C may guide movements of the guide unit 400 and the lens module 200 in the first direction.

When a driving force in the second direction is generated, the ball member C disposed between the guide unit 400 and the lens module 200 and between the carrier 300 and the lens module 200 may be rolled in the second direction. Therefore, the ball member C may guide movement of the lens module 200 in the second direction.

The lens module 200 and the carrier 300 may be accommodated in the housing 110. The housing 110 may be an open shape in a vertical direction (optical axis direction), and the lens module 200 and the carrier 300 may be accommodated in an inner space of the housing 110.

A printed circuit board on which an image sensor is mounted may be disposed in a lower portion of the housing 110.

The case 120 may be coupled to the housing 110 to surround an outer surface of the housing 110, and may function to protect internal components of the camera module. In addition, the case 120 may function to shield electromagnetic waves.

The case 120 may shield electromagnetic waves generated in the camera module such that the electromagnetic waves do not affect other electronic components in portable electronic devices.

Since many electronic components in addition to the camera module may be mounted on the portable electronic devices, the case 120 may shield electromagnetic waves generated in the electronic components such that the electromagnetic waves do not affect the camera module.

The case 120 may be formed of a metal material, and may be grounded to a ground pad provided on a printed circuit board, thereby shielding the electromagnetic waves.

The diaphragm module 500 may be configured to selectively change an incident amount of light incident on the lens module 200.

A plurality of apertures having different sizes may be implemented in the diaphragm module 500. Light may be incident through any one of the plurality of apertures depending on the photographing environment.

Figure 4:
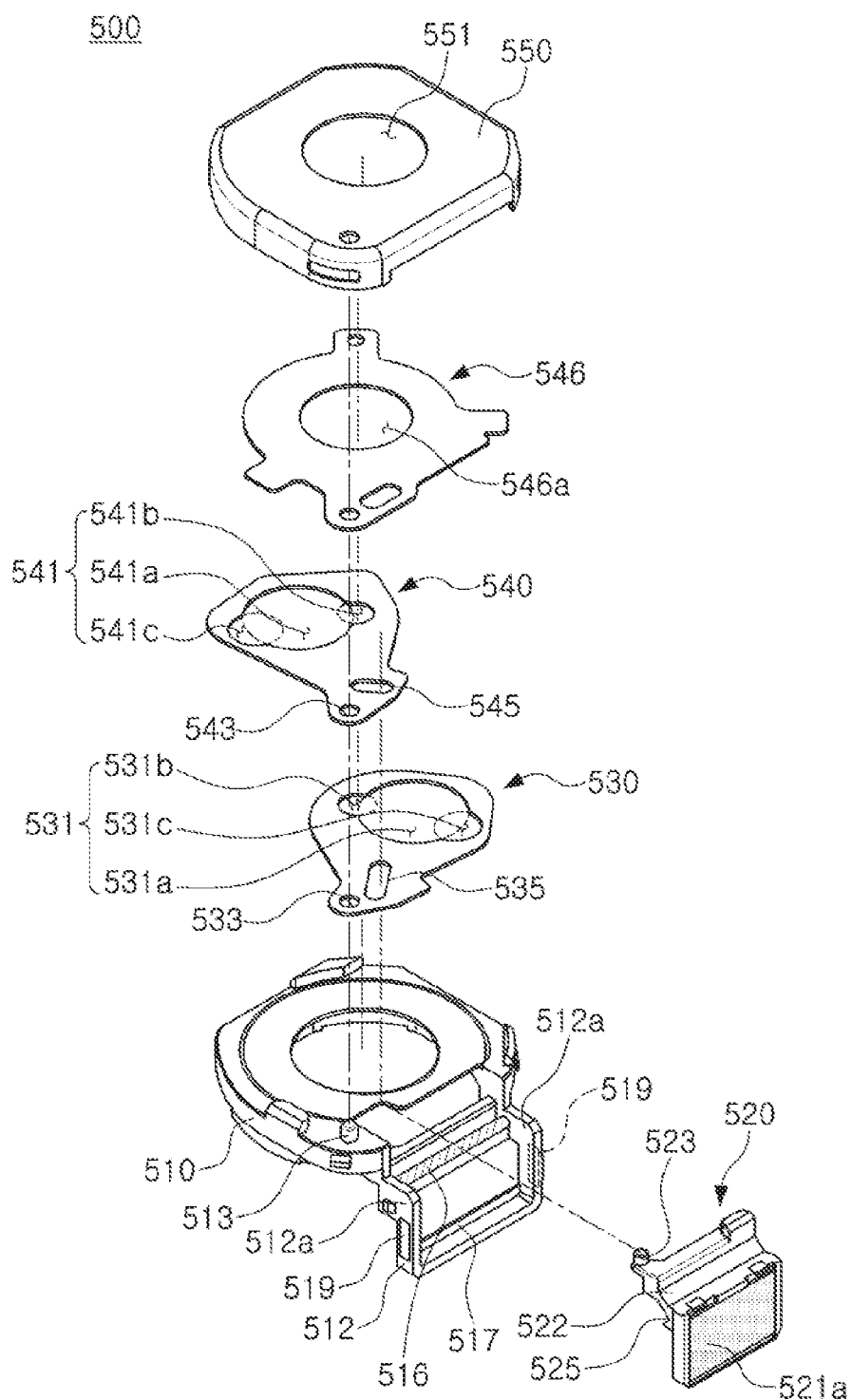
FIG. 4 is an exploded perspective view of a diaphragm module according to an example.
Figure 5A:
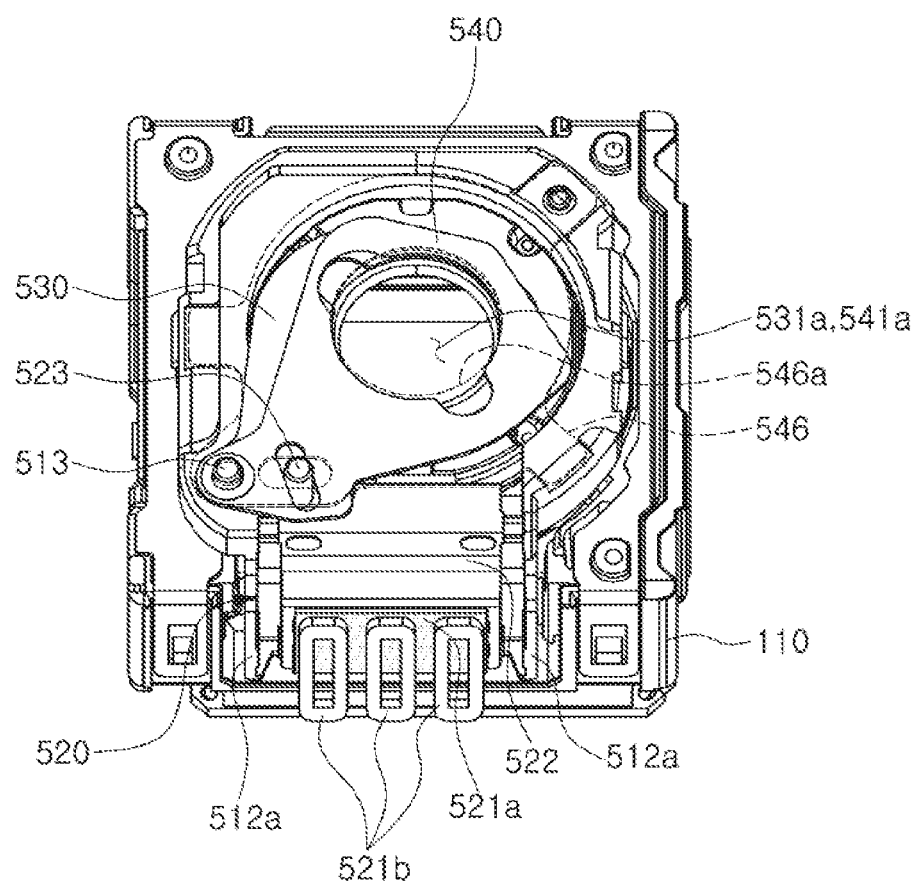
FIGS. 5A, 5B, and 5C are plan views illustrating a state in which a diaphragm module is driven to change a diameter of an aperture.
Figure 5B:
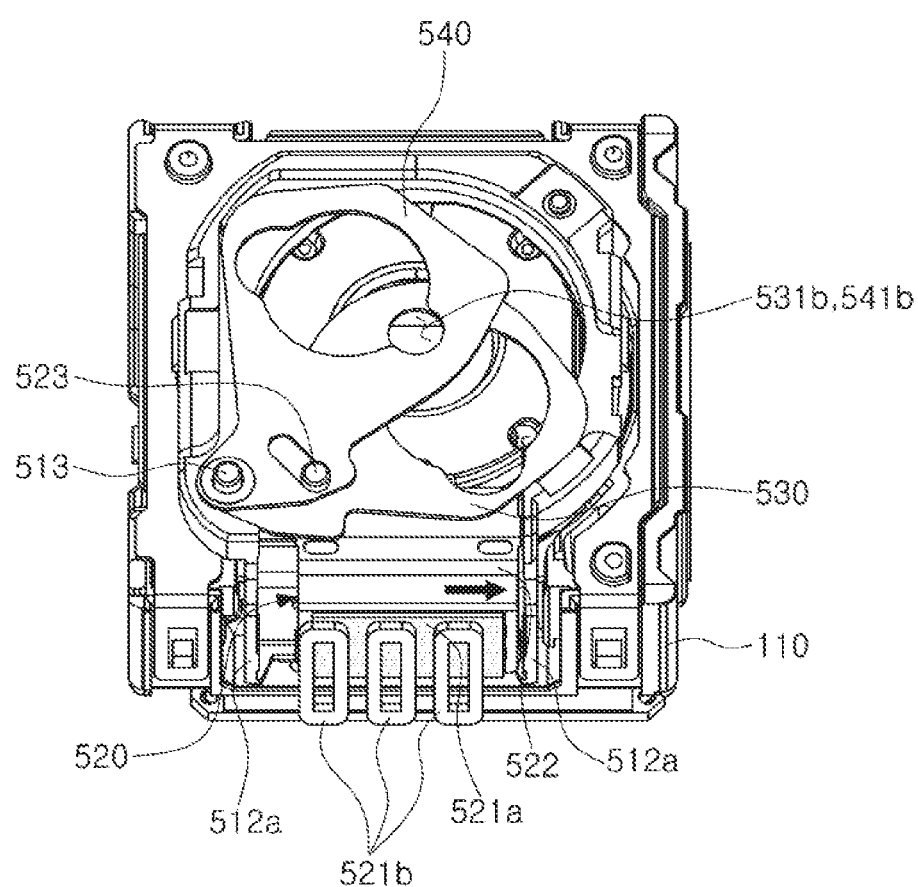
Figure 5C:
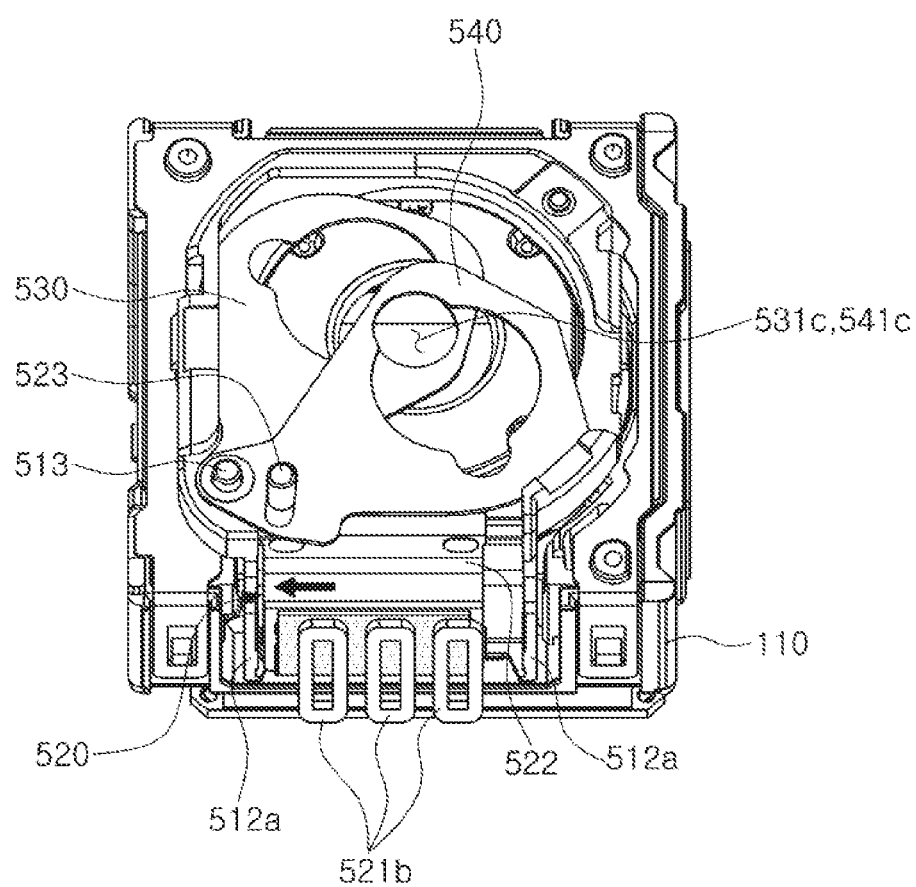

FIG. 4 is an exploded perspective view of a diaphragm module according to an example, and FIGS. 5A to 5C are plan views illustrating a state in which a diaphragm module is driven to change a diameter of an aperture.

A diaphragm module 500 may form at least two apertures having different sizes by arranging at least two blades in a stacked manner and combining through-holes provided therein. For example, two blades may be used to form three apertures. However, the number and arrangement of blades is not limited to such a configuration. For example, the diaphragm module may be capable of realizing three or more apertures of different sizes using three or more blades.

The diaphragm module 500 may be coupled to the lens module 200, and may be configured to selectively change an incident amount of light incident on the lens module 200.

A relatively small amount of light may be incident on the lens module 200 in a relatively high illumination environment. Meanwhile, a relatively large amount of light may be incident on the lens module 200 in a relatively low illumination environment. Therefore, image quality may be kept constant even under various illumination conditions.

The diaphragm module 500 may be configured to be movable together with the lens module 200 in combination with the lens module 200, in an optical axis direction, in a first direction perpendicular to the optical axis direction, and in a second direction perpendicular to the optical axis direction and the first direction. For example, when a focus adjustment operation and a shake correction operation are performed, the lens module 200 and the diaphragm module 500 may be moved together such that a distance therebetween does not change.

Referring to FIGS. 4 and 5A, the diaphragm module 500 may include a base 510, a first blade 530, a second blade 540, and a diaphragm driving unit (including a magnetic portion 520 and a coil 521b). A cover 550 covering the base 510, the first blade 530 and the second blade 540, and including a through-hole 551 through which light is incident, may also be included.

The first blade 530 may include a first through-hole 531, and the second blade 540 may include a second through-hole 541. Since the first blade 530 and the second blade 540 may slide in contact with each other, antistatic treatment may be performed to prevent generating frictional electricity.

The first blade 530 may include a first guide hole 533 and a third guide hole 535, and the second blade 540 may include a second guide hole 543 and a fourth guide hole 545.

The first guide hole 533 and the second guide hole 543 may be formed in a round shape, and the third guide hole 535 and the fourth guide hole 545 may be formed to be inclined in one direction, which may be a relatively elongated shape in one direction. The inclined directions of the third guide hole 535 and the fourth guide hole 545 may be opposite to each other with respect to a moving direction of the magnetic portion 520.

A linear motion of the magnetic portion 520 may be converted to a rotational motion, to rotate the first blade 530 and the second blade 540 about a first protrusion 513, which provides a rotation axis.

The first through-hole 531 and the second through-hole 541 may be formed in a shape in which a plurality of (in the N number, wherein the N number is natural number) through-holes 531a, 531b, and 531c, and 541a, 541b, and 541c having different diameters, respectively, are connected to each other. Three apertures may be formed as an example. The first through-hole 531 and the second through-hole 541 may be formed in a shape in which through-holes 531a and 541a having a relatively large diameter, through-holes 531b and 541b having a relatively small diameter, and through-holes 531c and 541c having a relatively intermediate diameter are connected to each other. For example, the first through-hole 531 may be formed in a shape in which three holes are connected to each other, and the through-holes 531a, 531b, 531c, 541a, 541b, and 541c may have a round shape or a polygonal shape.

The first through-holes 531 and the second through-holes 541 may have reverse shapes to each other. For example, the first blade 530 and the second blade 540 may be rotated about the first protrusion 513 in a state in which both the first guide hole 533 and the second guide hole 543 are fitted in the first protrusion 513. In consideration of the above, the first through-hole 531 and the second through-hole 541 may be in shapes that are substantially symmetrical in a circumferential direction.

The first blade 530 and the second blade 540 may be coupled to the base 510 such that a portion of the first blade 530 and a portion of the second blade 540 overlap each other in the optical axis direction, and may be configured to be movable by the diaphragm driving unit, respectively. The first blade 530 and the second blade 540 may be configured to be rotatable about the first protrusion 513 in directions opposite to each other.

A portion of the first through-hole 531 and a portion of the second through-hole 541 may be configured to overlap each other in the optical axis direction. A portion of the first through-hole 531 and a portion of the second through-hole 541 may overlap each other in the optical axis direction to form an aperture through which light passes.

A portion of the first through-holes 531 and a portion of the second through-holes 541 may overlap each other to form a plurality of apertures having different diameters. A portion of the first through-hole 531 and a portion of the second through-hole 541 may overlap each other to form through-holes 531a and 541a having a relatively large diameter, through-holes 531b and 541b having a relatively small diameter, and through-holes 531c and 541c having a relatively intermediate diameter (the apertures may have a round shape or a polygonal shape depending on shapes of the first through-hole 531 and the second through-hole 541).

Therefore, light may be incident through any one of a plurality of apertures according to the photographing environment.

The diaphragm module 500 may be adjusted by a gap spacer 546, when the size of the aperture is largest. The gap spacer 546 may be provided adjacent to the blades 530 and 540 of the diaphragm module 500, and may include a through-hole 546a that is smaller in size than the largest aperture formed by the blades 530 and 540, and is larger in size than the intermediate aperture. A center of the through-hole 546a may be aligned with a center of the aperture formed by the blades 530 and 540 in the optical axis direction.

For convenience of explanation, the example of FIG. 4 provides the gap spacer 546 on an upper surface of the upper blade 540 towards and adjacent to an object. However, the arrangement is not limited to such a configuration. The gap spacer 546 may be formed on an upper surface of the upper blade 540 towards and adjacent to an object, on a lower surface of the lower blade 530 towards and adjacent to an image, or in an intermediate portion between the first blade 530 and the second blade 540.

Therefore, the largest aperture implemented by the diaphragm module 500 may have a size of the through-hole 546a of the gap spacer 546. Implementation of the maximum sized aperture using the gap spacer 546 may be intended to cope with a situation in which a shape of the aperture formed by the blades 530 and 540 does not maintain an intended shape due to tolerances or the like.

Referring to FIG. 5A, when a magnetic portion 520 is positioned in a substantially middle portion of a movement guide unit 512 by a diaphragm driving unit, a first blade 530 and a second blade 540 may be rotated about a first protrusion 513 as an axis, and a portion of a first through-hole 531 and a portion of a second through-hole 541 may overlap each other, to form apertures 531a and 541a having the largest diameters. Meanwhile, the present embodiment has a gap spacer 546 having a through-hole 546a smaller than the largest apertures 531a and 541a formed by the first blade 530 and the second blade 540. In this case, the largest aperture may be formed by the through-hole 546a of the gap spacer 546.

Referring to FIG. 5B, when a magnetic portion 520 is positioned at one side of a movement guide unit 512 by a diaphragm driving unit, a first blade 530 and a second blade 540 may be rotated about a first protrusion 513 as an axis, and a portion of a first through-hole 531 and a portion of a second through-hole 541 may overlap each other, to form apertures 531b and 541b having the smallest diameters.

Referring to FIG. 5C, when a magnetic portion 520 is positioned on the other side opposite to the one side of the movement guide unit 512 by a diaphragm driving unit, a first blade 530 and a second blade 540 may be rotated about a first protrusion 513 as an axis, and a portion of a first through-hole 531 and a portion of a second through-hole 541 may overlap each other, to form apertures 531c and 541c having a relatively intermediate diameter.

A diaphragm driving unit may include a magnetic portion 520 disposed on a base 510 to be movable in a direction perpendicular to an optical axis direction, and a coil 521b, such as a diaphragm driving coil, fixed on a housing 110 to face a magnetic portion 520. The coil 521b may be provided on a substrate 900, and the substrate 900 may be fixed on the housing 110. The substrate 900 may be electrically connected to a printed circuit board attached to a bottom of a camera module 1000.

The example may use a closed control method in which a position of the magnetic portion 520 is sensed and fed back, when the magnetic portion 520 is linearly moved. Therefore, a position sensor (not illustrated) may be provided for a closed control. A position sensor (not illustrated) may be installed adjacent to a center or a side surface of the coil 521b to be opposite to a magnetic member 521a. A position sensor (not illustrated) may be installed on the substrate 900.

The magnetic portion 520 may be a movable member moving together with the base 510 in an optical axis direction, in a first direction, and in a second direction, and the coil 521b may be a fixation member fixed to the housing 110.

Since the coil 521b for providing driving force to the diaphragm module 500 may be disposed outside the diaphragm module 500, for example, the housing 110 of the camera module, a weight of the diaphragm module 500 may be reduced.

For example, since the coil 521b for providing driving force to the diaphragm module 500 may be provided as the fixation member, the coil 521b may not move during an operation for autofocusing adjustment or hand-shake correction. Therefore, an increase in weight of the lens module 200 according to the adoption of the diaphragm module 500 may be minimized.

Further, since the coil 521b for providing driving force to the diaphragm module 500 may be disposed in the housing 110 as the fixation member to be electrically connected to the printed circuit board, the coil 521b of the diaphragm driving unit may be not affected, even when the lens module 200 and the diaphragm module 500 are moved, during an operation for autofocusing adjustment or shake correction.

Therefore, it is possible to prevent the auto-focus adjustment function from deteriorating.

The base 510 may be provided with a movement guide unit 512 on which the magnetic portion 520 is disposed. The movement guide unit 512 may have a shape protruding from the base 510 in the optical axis direction. The movement guide unit 512 may be provided in a square frame shape to facilitate a mounting of the magnetic portion 520.

The magnetic portion 520 may include a magnetic member 521a attached to face the coil 521b, and a holder 522 to which the magnetic member 521a is attached. The magnetic member 521a may be a permanent magnet, a magnetized magnetic member, or a yoke that is a non-magnetized magnetic member, in a direction perpendicular to the optical axis. The magnetic member 521a may be provided to be opposite to the coil 521b in a direction perpendicular to the optical axis direction.

The magnetic portion 520 may be disposed on the movement guide unit 512 of the base 510. The base 510 may be provided with a rod member 516 for supporting the magnetic portion 520 such that the magnetic portion 520 slides easily. In addition, the magnetic portion 520 may be provided with an insertion groove 525 into which the rod member 516 may be inserted.

The rod member 516 may have a round rod shape or a plate shape to facilitate a sliding movement, and the insertion groove 525 may be provided in a cylindrical shape having a diameter smaller than that of the rod member 516 to be in line contact with the rod member 516, or may be provided in a polygonal shape, although an illustration thereof is omitted.

Further, in the case that only the rod member 516 comes into contact with the magnetic portion 520, since the fixation of the magnetic portion 520 may be unstable to occur tilting (inclination), a supporting portion may be provided in a portion further spaced apart from the rod member 516. For example, in an end portion of the movement guide unit 512, a guide blade 517 may be provided substantially in parallel with the rod member 516.

The base 510 may be provided with a first protrusion 513 which passes through a first guide hole 533 of the first blade 530 and a second guide hole 543 of the second blade 540 at the same time. The first blade 530 and the second blade 540 may rotate about the first protrusion 513 as an axis.

The holder 522 may be provided with a second protrusion 523 passing through the first blade 530 and the second blade 540.

The second protrusion 523 may be configured to pass through a third guide hole 535 of the first blade 530 and a fourth guide hole 545 of the second blade 540.

Meanwhile, the third guide hole 535 and the fourth guide hole 545 may be elongated to be inclined with respect to a moving direction of the magnetic portion 520. The third guide hole 535 and the fourth guide hole 545 may be inclined in directions opposite to each other with respect to a moving direction of the magnetic portion 520.

Therefore, when the magnetic portion 520 is moved along one axis, the second protrusion 523 may be moved in the third guide hole 535 and the fourth guide hole 545, and the first blade 530 and the second blade 540 may be moved toward or away from the magnetic portion 520, according to the movement of the second protrusion 523 (see FIGS. 5A to 5C).

The moving guide unit 512 may be provided with a holding yoke 519 at positions opposite to both sides of the magnetic member 521a.

The lens module 200 (more specifically, the holder 220) may have a yoke 225 (see FIG. 1) in a position opposite to the magnetic member 521a. The yoke 225 may be a magnetic metal member, and the like, when the magnetic member 521a is magnetized (permanent magnet), or may be provided with a permanent magnet, when the magnetic member 521a is a yoke and not magnetized.

The yoke 225 is illustrated only with those provided in the lens module 200, but is not limited to such a configuration, and may be provided in the movement guide unit 512 of the diaphragm module 500. More specifically, the yoke 225 may be fixed to the movement guide unit 512 in a position closer to the optical axis than the magnetic portion 520, to prevent the magnet portion 520 from being separated by an attraction force with the magnetic portion 520. The magnetic portion 520 may be slid while maintaining a state in which the magnetic portion 520 is in tight contact with the movement guide unit 512 by the attraction force between the yoke 225 and the magnetic member 521a.

Further, the magnetic portion 520 may move in a direction perpendicular to the optical axis direction, and the first and second blades 530 and 540 may rotate according to a movement of the magnetic portion 520, to change a size of the aperture to three grades (large, intermediate, and small). When the magnetic portion 520 is moved to one end of the movement guide unit 512 in a direction perpendicular to the optical axis direction, the size of the aperture may be changed to three grades, such as large, intermediate, and small sizes (or in N number, wherein the N number is natural number), and a state in which the magnetic portion 520 is fixed to three (3) (N) positions of both end portions and an intermediate portion of the movement guide unit 512 may be maintained.

For example, when the magnetic portion 520 moves along the movement guide unit 512 in a direction perpendicular to the optical axis direction, the diaphragm driving unit, including the magnetic portion 521a and the driving coil 521b, may be maintained in a state in which the magnetic portion 520 is fixed in three (3) (N) positions. For example, the magnetic portion 520 may be fixed in a predetermined position according to a power applied to the coil 521b, to form one of large, intermediate, and small apertures.

Figure 6A:
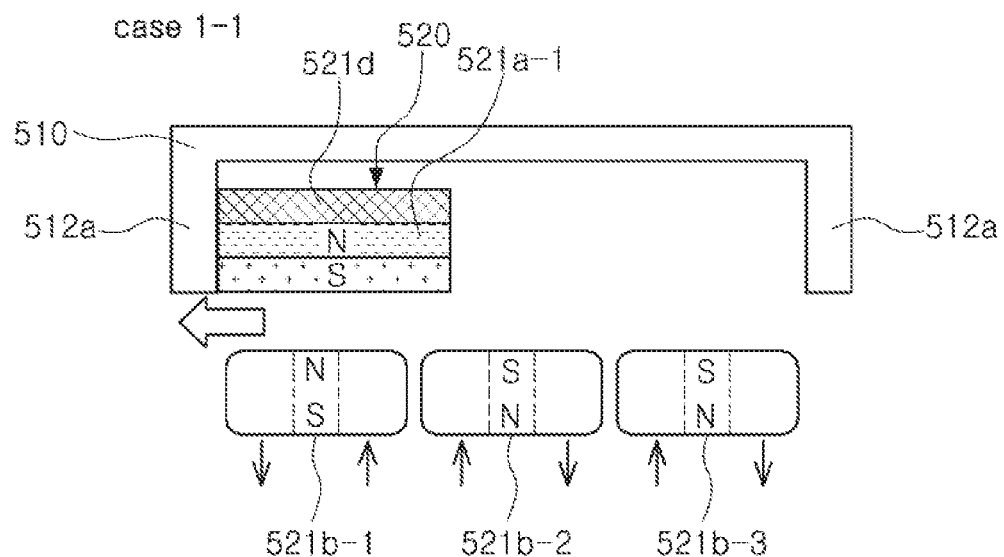
FIGS. 6A, 6B, and 6C are cross-sectional views illustrating a driving concept of a diaphragm driving unit according to an example.
Figure 6B:
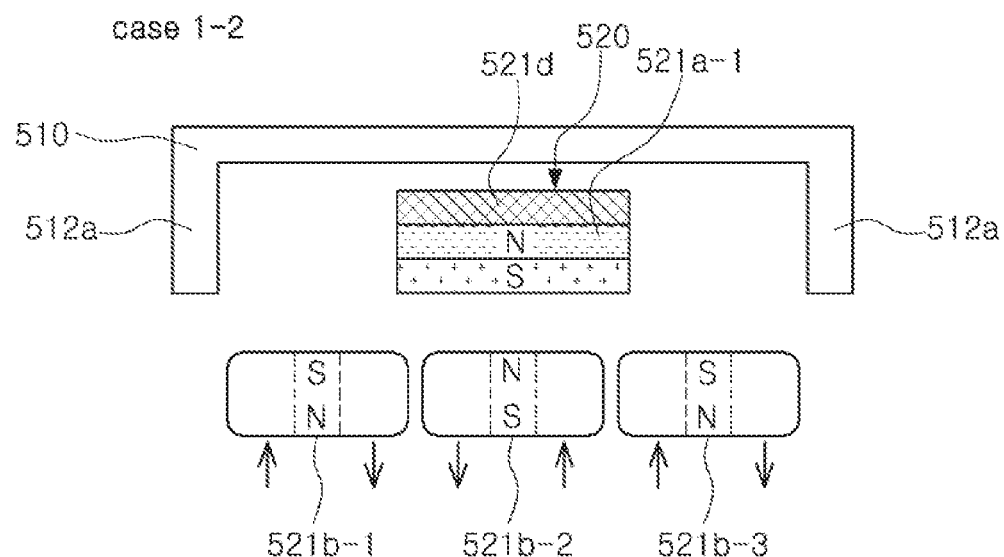
Figures 6C, 7:
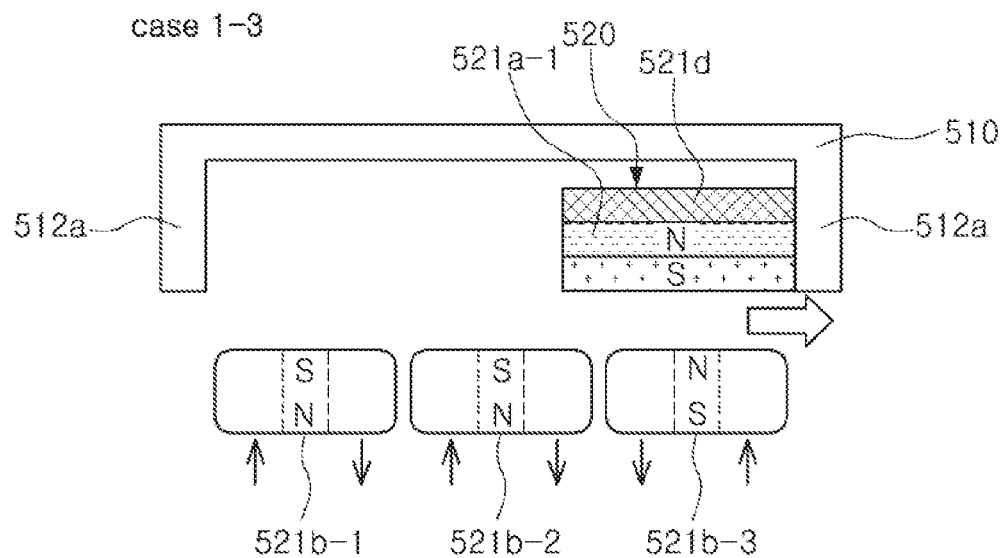
FIG. 7 is a reference view illustrating an example in which a polarity of a coil is changed according to an electric current applied to the coil, as illustrated in FIGS. 6A, 6B, and 6C.

FIGS. 6A to 6C are cross-sectional views illustrating a driving concept of a diaphragm driving unit according to an embodiment of the present disclosure, and FIG. 7 is a reference view illustrating an embodiment in which a polarity of a coil is changed according to an electric current applied to the coil, as illustrated in FIGS. 6A to 6C.

Referring to FIGS. 6A to 6C, a magnetic portion 520 may move to a predetermined position according to a power applied to N (three) coils. As a result, as described with reference to FIGS. 5A to 5C, a size of the aperture of the diaphragm module 500 may be changed.

The driving unit of the diaphragm module 500 may include the magnetic portions 520, including one driving magnet 521a-1 magnetized with a permanent magnet, and N driving coils 521b-1, 521b-2, and 521b-3, which are provided to be opposite to each other along the moving path of the driving magnet 521a-1. Further, the diaphragm driving unit may include stoppers 512a provided at both end portions of the movement path of the magnetic portion 520 to limit the movement path of the magnetic portion 520 having the driving magnet 521a-1. A yoke 521d may be provided on a rear surface of the driving magnet 521a-1.

One side of the driving magnet 521a-1 that faces the driving coils 521b-1, 521b-2, and 521b-3 may be magnetized to the N-pole or the S-pole. Further, winding directions of the N (three) driving coils 521b-1, 521b-2, and 521b-3 may be arranged such that a surface opposite to the driving magnet 521a-1 may be magnetized to the N pole or the S pole, respectively.

The diaphragm module 500 illustrated in FIGS. 6A to 6C has the magnetic portions 520 moved to the leftmost, middle, and rightmost sides (cases 1-1, 1-2, and 1-3), respectively, and is arranged such that a surface opposite to the driving coils 521b-1, 521b-2, and 521b-3 of the driving magnet 521a-1 is magnetized to the S-pole direction. In each case, power may be applied to the driving coils 521b-1, 521b-2, and 521b-3 such that the driving coils 521b-1, 521b-2, and 521b-3 may be magnetized as illustrated in FIG. 7. Further, a driving operation having the same structure may occur in the magnet and the coil illustrated in FIGS. 6A to 6C, and 7, when polarity is reversely magnetized (i.e., when all N poles are converted to S poles, and all S poles are converted to N poles, a driving operation having the same structure may occur).

Figure 8A:
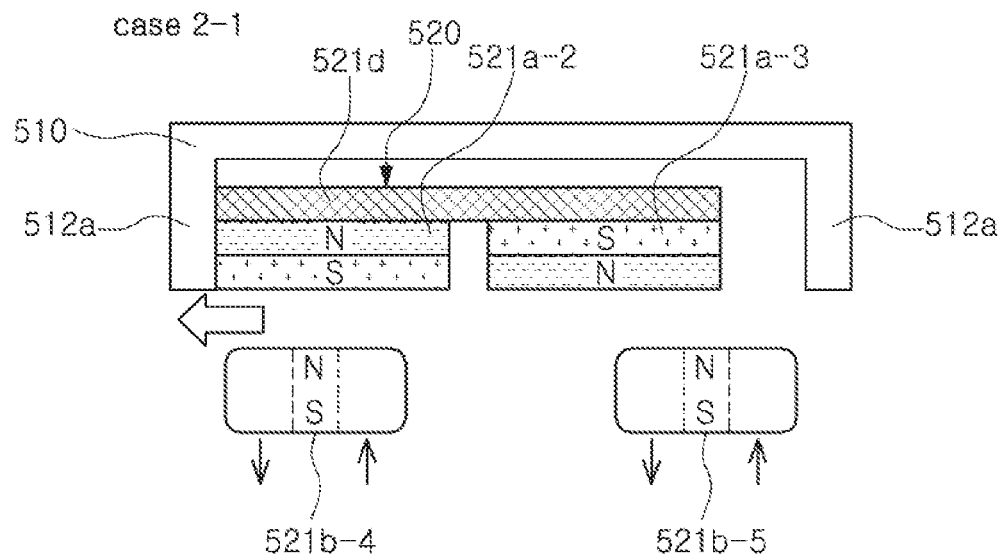
FIGS. 8A, 8B, and 8C are cross-sectional views illustrating a driving concept of a diaphragm driving unit according to an example.
Figure 8B:
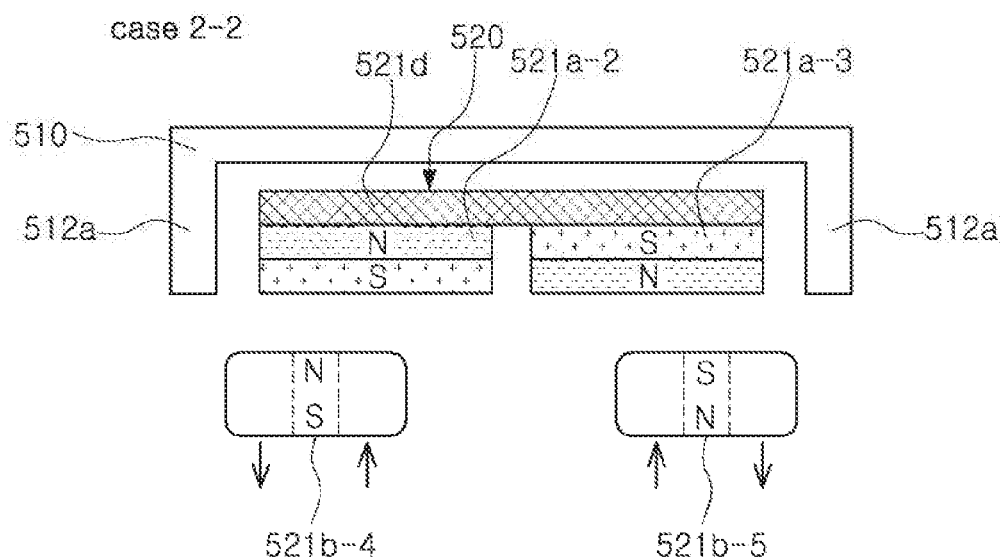
Figures 8C, 9:
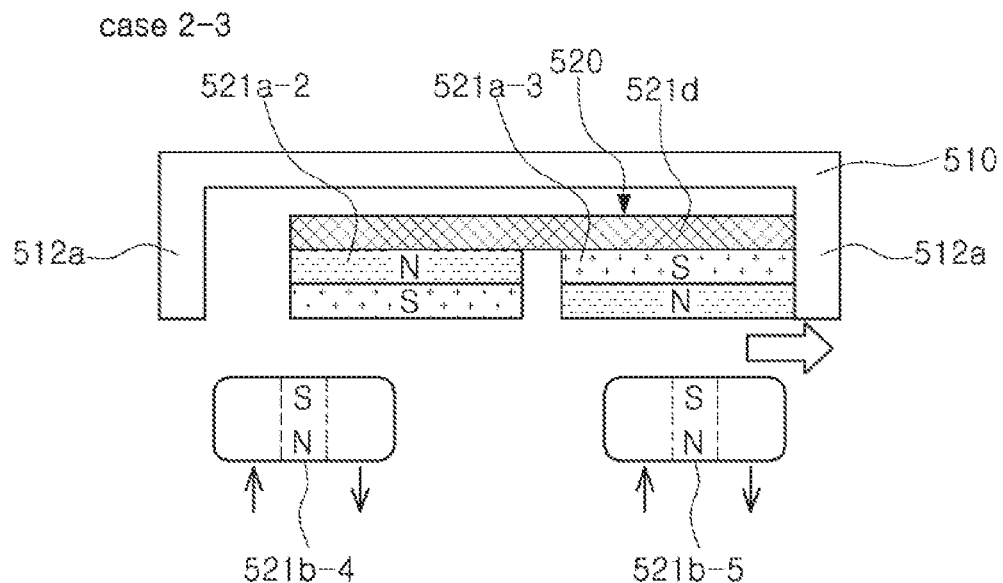
FIG. 9 is a reference view illustrating an example in which a polarity of a coil is changed according to an electric current applied to the coil, as illustrated in FIGS. 8A, 8B, and 8C.

FIGS. 8A to 8C are cross-sectional views illustrating a driving concept of a diaphragm driving unit according to an example, and FIG. 9 is a reference view illustrating an example in which a polarity of a coil is changed according to an electric current applied to the coil, as illustrated in FIGS. 8A to 8C.

Referring to FIGS. 8A to 8C, a magnetic portion 520 may move to a predetermined position according to a power applied to N (three) coils. As a result, as described with reference to FIGS. 5A to 5C, a size of the aperture of the diaphragm module 500 may be changed.

The driving unit of the diaphragm module 500 may include two (2) driving magnets 521a-2 and 521a-3 magnetized with a permanent magnet, which may include those including one member and having a surface opposite to the driving coil magnetized to the N and S poles along the moving path of the magnetic portion 520, and those including two (2) members, and two (2) driving coils 521b-4 and 521b-5, which are provided to be opposite to each other along the moving path of the driving magnets 521a-2 and 521a-3. Further, the diaphragm driving unit may include stoppers 512a provided at both end portions of the movement path of the magnetic portion 520 to limit the movement path of the magnetic portion 520 having the driving magnet 521a-1. A yoke 521d may be provided on a rear surface of the driving magnets 521a-2 and 521a-3.

Further, in the driving magnets 521a-2 and 521a-3, a surface opposite to the driving coils 521b-4 and 521b-5 may be magnetized to the N and S poles in sequence in a driving direction of the magnetic portion 520, respectively. Further, the two (2) driving coils 521*b*-4 and 521*b*-5 may be arranged in a winding direction such that the surfaces facing the driving magnets 521*a*-2 and 521*a*-3 may be magnetized to the N-pole or the S-pole.

The diaphragm module 500 illustrated in FIGS. 8A to 8C has the magnetic portions 520 moved to the leftmost, middle, and rightmost sides (cases 1-1, 1-2, and 1-3), respectively, and is arranged such that a surface opposite to the driving coils 521*b*-4 and 521*b*-5 of the driving magnets 521*a*-2 and 521*a*-3 is sequentially magnetized from the left to the right to the S pole and the N pole. In each case, power may be applied to the driving coils 521*b*-4 and 521*b*-5 such that the driving coils 521*b*-4 and 521*b*-5 may be magnetized as illustrated in FIG. 9. Further, a driving operation having the same structure may occur in the magnet and the coil illustrated in FIGS. 8A to 8C, and 9, when polarity is reversely magnetized (i.e., when all N poles are converted to S poles, and all S poles are converted to N poles, a driving operation having the same structure may occur).

Figure 10A:
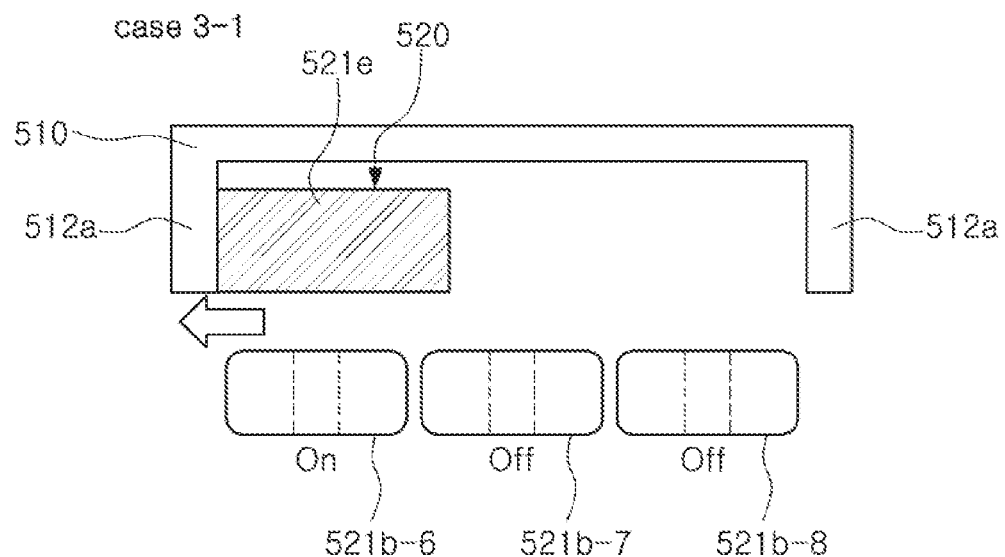
FIGS. 10A. 10B, and 10C are cross-sectional views illustrating a driving concept of a diaphragm driving unit according to an example.
Figure 10B:
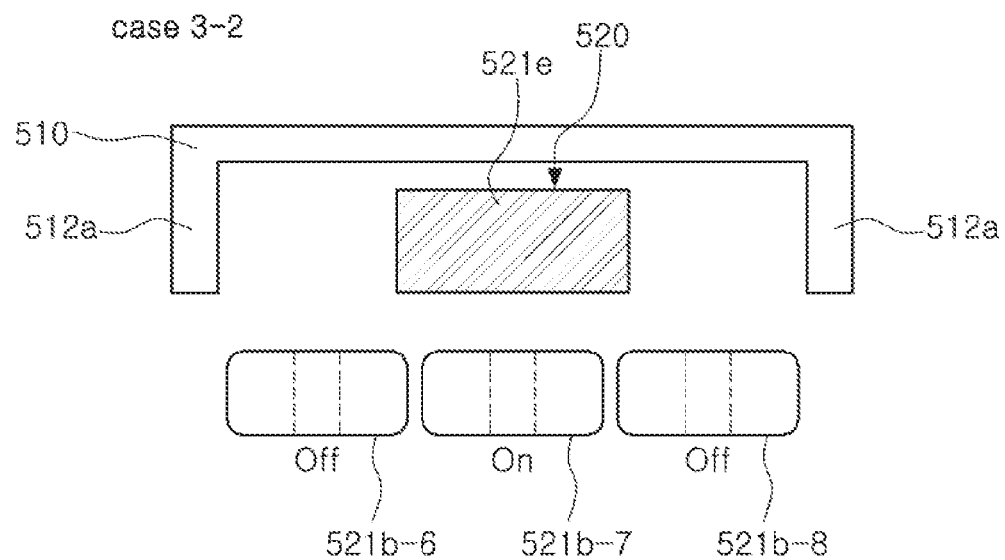
Figures 10C, 11:
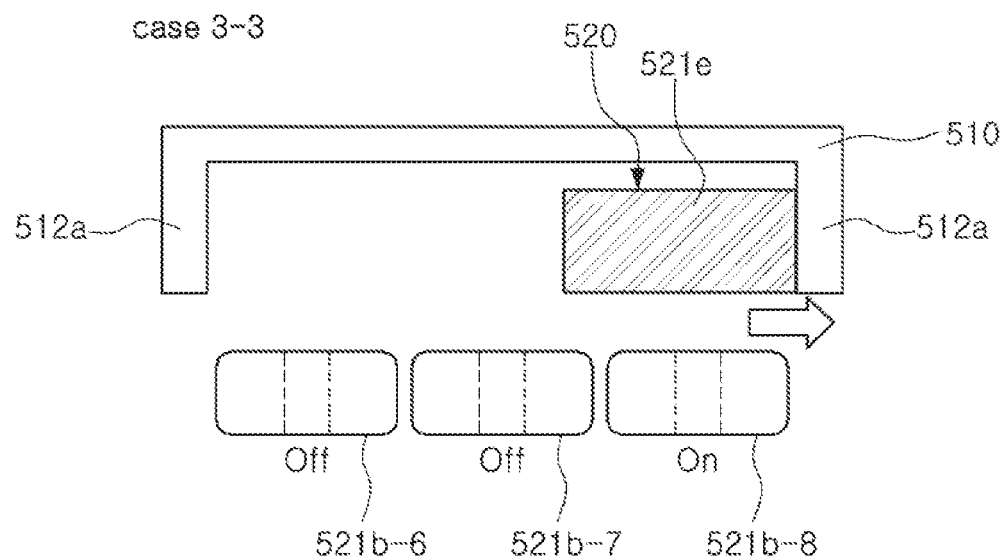
FIG. 11 is a reference view illustrating an example in which power is supplied to coils according to electric currents applied to the coils, as illustrated in FIGS. 10A, 10B, and 10C.

FIGS. 10A to 10C are cross-sectional views illustrating a driving concept of a diaphragm driving unit according to an example, and FIG. 11 is a reference view illustrating an example in which power is supplied to coils according to electric currents applied to the coils, as illustrated in FIGS. 10A to 100.

Referring to FIGS. 10A to 10C, a magnetic portion 520 may move to a predetermined position according to a power applied to N (three) coils. As a result, as described with reference to FIGS. 5A to 5C, a size of the aperture of the diaphragm module 500 may be changed.

The driving unit of the diaphragm module 500 may include one driving yoke 521*e* that is not magnetized, and N (three) driving coils 521*b*-6, 521*b*-7, and 521*b*-8, which are provided to be opposite to each other along the moving path of the driving yoke 521*e*. Further, the diaphragm driving unit may include stoppers 512*a* provided at both end portions of the movement path of the magnetic portion 520 to limit the movement path of the magnetic portion 520 having the driving yoke 521*e*.

The N (three) driving coils 521*b*-6, 521*b*-7, and 521*b*-8 may be arranged in the winding direction such that the surface opposite to the driving yoke 521*e* may be magnetized to the N-pole or the S-pole.

The diaphragm module 500 illustrated in FIGS. 10A to 100 has the magnet portions 520 (driving yoke 521*e*) moved to the leftmost, middle, and rightmost sides (cases 1-1, 1-2, and 1-3), respectively. In each case, power may be applied to the driving coils 521*b*-6, 521*b*-7, and 521*b*-8 as illustrated in FIG. 11 in the driving coils 521*b*-6, 521*b*-7, and 521*b*-8. Since the driving yoke 521*e* has no polarity, it may be not necessary to consider the magnetizing direction of the driving coils 521*b*-6, 521*b*-7, and 521*b*-8. However, in order to increase the efficiency, the N driving coils 521*b*-6, 521*b*-7, and 521*b*-8 may be arranged such that the surface facing the driving yoke 521*e* may be magnetized to the N pole or the S pole, respectively.

According to the examples, the camera module may selectively change the incident amount of light through the diaphragm module, and the performance of the autofocusing adjustment function may be prevented from being deteriorated even when the diaphragm module is mounted, an increase in weight according to the adoption of the diaphragm module may be minimized.

The camera module according to the examples may minimize an increase in weight of the driving unit even when the diaphragm module may be mounted and maintain the performance of the auto-focus and image stabilization function.

Further, the diaphragm module according to the examples may accurately realize various apertures.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing comprising a lens module;
   a diaphragm module configured to form N apertures of different sizes, where N is a natural number, with blades disposed on an object side of the lens module; and
   a diaphragm driving unit disposed with the diaphragm module, and comprising N driving coils and a magnetic member disposed opposite to the driving coils, the magnetic member configured to be movable in a direction perpendicular to an optical axis and to be fixed in N positions along a movement path.

2. The camera module according to claim 1, wherein the magnetic member comprises a driving magnet magnetized with a permanent magnet.

3. The camera module according to claim 1, wherein a surface of the driving magnet opposite to the N driving coils is magnetized to the N pole or S pole.

4. The camera module according to claim 3, wherein surfaces of the N driving coils opposite to the driving magnet are magnetized to the N pole or S pole, respectively.

5. The camera module according to claim 1, wherein N is equal to three.

6. The camera module according to claim 2, wherein N is equal to three.

7. The camera module according to claim 6, wherein the driving magnet comprises two driving magnets, and N is greater than or equal to two.

8. The camera module according to claim 7, wherein the two driving magnets are magnetized such that one surface of each of the two driving magnets opposing the driving coils is magnetized to the N pole and another surface of each of the at least two driving magnets is magnetized to the S pole.

9. The camera module according to claim 8, wherein surfaces of the driving coils opposite to the driving magnets are magnetized to the N or S pole, respectively.

10. The camera module according to claim 1, wherein the magnetic member comprises a non-magnetized driving yoke.

11. The camera module according to claim 10, wherein surfaces of the driving coils opposite to the driving yoke are magnetized to the N pole or S pole, respectively.

12. The camera module according to claim 10, wherein N is equal to three.

13. The camera module according to claim 1, wherein the diaphragm driving unit comprises stoppers disposed at end portions of the movement path to restrict movement of the magnetic member.

14. The camera module according to claim 1, wherein the driving coils are disposed in the housing.

15. A camera module comprising:
a lens module;
blades configured to form N apertures to selectively change an amount of light incident on the lens module, where N is a natural number;
N driving coils; and
a magnetic portion disposed opposite to the N driving coils and configured to move linearly along a movement path in order to rotate the blades to form the N apertures.

16. The camera module of claim 15, wherein the magnetic portion comprises a magnetic member opposed to the N driving coils, and the magnetic member is configured to be fixed at N positions along the movement path in order to form the N apertures.

17. The camera module of claim 15, wherein the blades comprise a first blade and a second blade, and a portion of the first blade and a portion of the second blade overlap each other in an optical axis direction.

18. The camera module of claim 15, further comprising a gap spacer disposed between the blades and the lens module, and comprising a through-hole smaller in size than a size of a largest aperture formed by the blades.

* * * * *